United States Patent Office 3,396,135
Patented Aug. 6, 1968

3,396,135
COATING COMPOSITION CONTAINING STYRENE-MALEIC ANHYDRIDE PARTIAL ESTER COPOLYMER AS EMULSIFIER
Charles F. Bishop, Longmeadow, Mass., assignor to Monsanto Company, St. Louis, Mo., a corporation of Delaware
No Drawing. Filed July 2, 1964, Ser. No. 380,025
11 Claims. (Cl. 260—29.6)

This invention relates to a novel coating composition and in particular to a coating composition for coating cellulosic paper substrates.

Coating compositions containing styrene latices are well-known in the art and have been used successfully. These coatings are applied to cellulosic paper containers such as drinking cups and in particular those employed in vending machines. However, due to the increase in paper cups being employed with hot drinking fluids, there is a greater demand for coatings which will not tackify or stick together at elevated temperatures. This property is known as an anti-blocking property. Today the use of conventional styrene latices with film-forming materials such as a styrene-butadiene latex produces coating films which will block or tackify at temperatures of about 145° F. Various additives have been suggested in an attempt to increase anti-blocking properties. Such additives have included the use of a salt of a styrene maleic anhydride copolymer which when added to an emulsion polymerized latex after polymerization thereof the additive did not increase the anti-blocking properties.

In addition to the above, there is also a demand for coatings which will have what is known as good or excellent "coating holdout" properties. This is where the coating will lie on the surface of the paper substrate and not go into the interstices of the paper. This is important since the coating prevents staining of the paper substrate by the drinking fluid. By the same token the flavor of the drinking fluid is not affected or contaminated by the paper substrate. Basically, what is needed is excellent coverage of the paper substrate by the coating composition.

In attempts to increase anti-blocking properties and better "coating holdout" properties, various additives have been employed. Unfortunately, these additives have an adverse effect on one or the other properties and invariably tended to reduce the gloss of the coatings. It is desirable in the industry that any coating compositions employed in coating paper substrates have a high degree of gloss. It is, therefore, desirable to the industry to have a coating composition which when applied to a cellulosic paper substrate would have excellent anti-blocking properties at elevated temperatures and excellent "coating holdout" while maintaining a high degree of gloss.

Therefore, it is an object of this invention to provide a novel coating composition.

Another object of this invention is to provide a cellulosic substrate coated with the novel coating composition.

Other objects of this invention will in part be obvious and will in part be set out and appear hereinafter.

Briefly, the objects of this invention are attained by preparing a novel coating composition consisting of a homogeneous blend of an emulsion polymerized styrene homopolymer latex containing as the sole emulsifier a salt of a partial ester of a styrene maleic anhydride copolymer and an emulsion polymerized styrene interpolymer latex. The essential feature of the instant application is found in the use of a particular emulsifier in preparing the emulsion polymerized latex of a styrene homopolymer. The latex so prepared with the particular emulsifier can be called a self-supported polystyrene latex.

The following examples are set forth to illustrate more clearly the principle and practice of this invention to those skilled in the art and are not to be construed as limitations on the invention. Unless otherwise stated all parts and percentages are on a weight basis.

EXAMPLE I

Part A

A coating composition is prepared by homogeneously blending 45 parts of a 50% solids polystyrene latex, 55 parts of a 50% solids styrene-butadiene copolymer of a 60/40 weight percent ratio respectively and 1.5 parts of a 40% solids non-reactive siloxane polymeric emulsion. The polystyrene latex and the styrene butadiene employed herein are prepared by an emulsion polymerization process wherein a conventional emulsifying agent is used which is a combination of an ethylene oxide condensate of nonylphenol and a sodium salt of an alkyl aryl polyether sulfate. This emulsifying agent is referred to as a soap. This coating composition is designated as Composition A.

Part B

Part A above is repeated except that to the blend is also added two parts of an ammonium salt of a butyl Cellosolve ester of a styrene maleic anhydride copolymer which parts are based on 100% solids.

This coating composition is designated as Composition B.

Part C

A coating composition consisting of a blend of 55 parts of a 50% solids polystyrene latex, 45 parts of a 50% solids latex of a styrene-butadiene copolymer of a 60/40 weight percent ratio, respectively, and 1.5 parts of a 40% solids non-reactive siloxane polymeric emulsion. The polystyrene employed to prepare this coating composition is prepared by the well-known emulsion polymerization process except that as the sole emulsifier an ammonium salt of a butyl Cellosolve ester of a styrene maleic anhydride copolymer is used and the amount employed is 15 parts by weight on a solids basis per 100 parts of the styrene monomer employed in preparing the self-supported emulsion polymerized polystyrene latex of this invention.

The coating composition employed herein is designated as Composition C.

EXAMPLE II

Part A

With each of the coating compositions of Example I, Parts A, B and C, the interior surfaces of a number of cellulosic paper cups are coated by the flush coating technique. This involves placing 5 grams of the coating composition in a cellulosic paper cup and spinning the cup at 2000 rpms for one second. The coated cups are then dried in an oven for 2 minutes at 275° F. The solids pickup of each cup is about 0.25 gram.

Part B

The coated cups of Part A are tested for their anti-block properties or as sometimes referred to as tackifying properties. This test is run by nesting on top of one another 15 cups coated with the same coating composition. Thus, three stacks of 15 cups each are prepared, employing coating composition A, B and C. On top of each stack, a 2 lb. weight is placed. The individual stacks are then placed in an oven at 190° F. for 16 hours and at a controlled relative humidity of 90%. The cups are removed and allowed to cool to room temperature. The weight is then removed and each stack is examined to determine the ease with which the cups freely separate or part from each other due to their own weight. The cups coated with Compositions A and B did not freely separate and force is required to separate them. In each case, separation of the cups resulted in rupturing of the coated film or of the paper fibers.

The cups coated with the Composition C, which is the composition of this invention, separated freely without any sticking.

Each cup coated with Composition C is also noted to be uniformly coated on the interior surfaces thereof and the coating has excellent gloss. This example clearly shows that the coating composition of this invention has excellent anti-blocking properties at a temperature of 190° F. while still possessing excellent gloss.

EXAMPLE III

This example is set forth to show the coating holdout or coating coverage of the interior surfaces of cups coated with the coating Compositions A, B and C.

Cellulosic paper cups are coated on the interior surfaces thereof in the same manner as set forth in Example II, Part A. Each cup is then filled with percolated black coffee at a temperature of 210° F. Each cup containing the black coffee is then allowed to stand for 20 minutes. At the end of this time the coffee is removed and the interior surface of each cup is examined for stain. Cups coated with coating Compositions A and B were stained in the seams and fillets of the cups showing poor coating at these areas. Cups coated with Composition C, which is the composition of this invention, have no staining on the interior surfaces thereof and in particular no staining along the seams or fillets of the cup. This clearly shows that the composition of this invention has excellent "coating holdout."

EXAMPLE IV

Example III is repeated except that when coating the cellulosic paper cups on the interior surfaces thereof with Compositions A, B and C by the method of Example II, Part A, only three grams of each coating composition is employed herein. The dried cups are found to have a resin pickup of about 0.15 gram.

The coating holdout of the cups are tested in the same manner as set forth in Example III. Cups coated with Compositions A and B are badly stained with coffee on various parts of the interior surfaces of the cups. This indicates poor coating with compositions of A and B.

Cellulosic paper cups coated with Composition C again exhibited no staining showing excellent coating holdout when employing the coating composition of this invention. In addition, the coating of Composition C has excellent gloss.

This invention is directed to a novel coating composition and to cellulosic paper substrates coated with the novel coating composition. The coating composition of this invention consists of a homogeneous blend of 30–70 parts by weight of an emulsion polymerized styrene homopolymer latex containing as the sole emulsifier 10–40 weight percent thereof of a salt of a partial ester of a styrene maleic anhydride copolymer and, correspondingly, 70–30 parts by weight of an emulsion polymerized styrene interpolymer latex; said salt of a partial ester of a styrene maleic anhydride copolymer having a molecular weight of about 1000–20,000 and having in its structure recurring groups of the formulae:

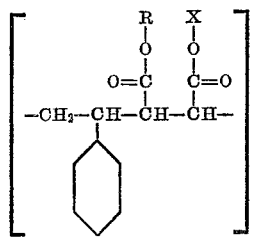

I and

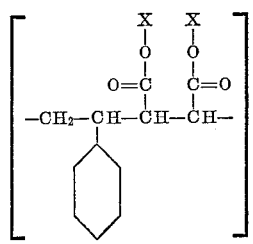

II with the groups of Formula I constituting 20–100% of the total of the groups of Formulae I and II and wherein R is any organic radical of 1–20 carbon atoms and wherein X is selected from the group consisting of ammonium, substituted ammonium and alkali metal ions; said styrene interpolymer consisting of at least 50 weight percent of styrene with the balance thereof being any other monomeric material which is interpolymerizable with the styrene. The substituted ammonium ions that are particularly useful in the practice of this invention are ions formed from such compounds as mono-, di- and trimethyl amines, mono-, di- and triethyl amines, mono-, di-, tri- and isopropyl amines, mono-, di- and triethanol amines, 2-methyl-2-amino-propanol-1, and mixtures thereof. The alkali metal ions are lithium, sodium potassium, etc. More particularly, a preferred embodiment of this invention is wherein the number of groups in Formula I as set forth above constitutes 30–70% of the total of the groups of Formulae I and II.

The critical feature of the composition of this invention is that the emulsion polymerized styrene homopolymer latex is prepared by an emulsion polymerization process wherein the particular styrene maleic anhydride copolymer is used as the sole emulsifying agent. As stated above the particular emulsifier employed is a salt of a partial ester of a styrene maleic anhydride copolymer and includes up to the half ester thereof. The ester portion of the particular styrene maleic anhyride copolymer is represented by R in Formula I above and is any organic radical of 1–20 carbon atoms consisting of carbon and hydrogen with or without oxygen, nitrogen or other elements. It is preferably selected from the group consisting of alkyl, aryl, alkaryl, aralkyl and cycloalkyl radicals. Particularly useful are the alkyl radicals such as methyl, ethyl, propyl, butyl, dodecyl, etc.; aromatic radicals such as benzyl, etc.; the ether radicals such as butoxy ethyl, propoxy ethyl, furfuryl, methyl ether of diethylene glycol, methyl ether of triethylene glycol, thioethers, etc.; the amino radicals such as dimethyl amino ethyl, etc.; and the cyclo alkyl radicals such as cyclo hexyl, cyclo pentyl, etc. The amount of the particular styrene maleic anhydride emulsifier constitutes 10–40 weight percent based on the weight of the styrene monomer employed to prepare the styrene homopolymer. Preferably, in the practice of this invention the amount of the particular styrene maleic anhydride copolymer is in the range of 10–20 weight percent thereof. It is believed that this particular emulsifier reacts somewhat with the styrene monomer during the polymerization thereof. This is evidenced by the fact that the solubility characteristics of the styrene polymer so prepared as described herein is different from that of styrene homopolymers prepared using conventional emulsifiers such as the various alkali metal salts of monocarboxylic acids, ethylene oxide condensate of nonylphenol, the sodium salt of an alkyl aryl polyether sulfate, etc. It is noted that such styrene polymers as prepared with conventional emulsifiers are completely soluble in toluene benzene, etc. The polymers so prepared herein with the particular styrene maleic anhydride copolymer as the emulsifier are not easily soluble in such solvents. In addition, on attempting to recover the particular styrene maleic anhydride copolymer from the styrene homopolymer, it is noted that only approximately 80–90 weight percent thereof as employed originally can be recovered. Therefore, such evidence indicates that the particular emulsifier employed in the practice of this invention probably reacts with the styrene monomer during polymerization thereof.

As stated previously, the partial esters of the styrene maleic anhydride copolymers include partial esters up to and including the half ester of styrene maleic anhydride copolymers.

Another critical feature of the instant coating composition is that it must contain a styrene interpolymer. Styrene interpolymers employed in the practice of this invention are those which are generally prepared by an emulsion polymerization process from an aqueous latex. The interpolymers of styrene employed herein should be those interpolymers which contain at least 50 weight percent and preferably 75 weight percent of styrene with the balance thereof being any monomeric compound which will interpolymerize with styrene and particularly those monomeric compounds having the vinylidene group $CH_2=C<$. These monomeric materials include such compounds as mono- and di-olefins, e.g., ethylene, propylene, isobutylene, butadiene, isoprene; acrylamide, methacrylamide, methacrylonitrile, acrylonitrile; acrylic acid and methacrylic acid esters of alcohols containing 1–18 carbon atoms such as methyl and ethyl methacrylate, other vinylidene aromatic compounds, e.g., alpha-methylstyrene, vinyl toluene, p-ethylstyrene, 2,4-dimethylstyrene, chlorostyrene, 2,5-dichlorostyrene, vinyl naphthalene; etc. Other monomers which can be interpolymerized with styrene for the purposes of the present invention include diethyl maleate, dibutyl fumarate, etc. It may be feasible and desirable to employ blends of two or more such thermoplastic styrene polymers. The preferred styrene interpolymer to be employed in the practice of this invention is the copolymer of styrene and butadiene. Preferably, the copolymer should contain at least 60 weight percent of styrene and, correspondingly, up to 40 weight percent of butadiene.

In the practice of the instant invention other materials may be incorporated with the coating composition to provide beneficial properties to the coatings. These include such materials as stable non-reactive siloxane polymeric emulsions, natural and synthetic waxes, polyethylene, etc. These materials act as slip agents so that when coated cups employing the composition of this invention are nested they will easily and freely separate. This is necessary in todays extensive use of such cups in vending machines.

In addition to the above, other materials may be added without detracting from the scope of this invention to aid or increase the properties of the coating. For example, it may be desirable to include a certain percentage of a styrene homopolymer which is prepared by conventional means. Such styrene homopolymers can be used to adjust the viscosity of the coating composition to allow its use with various types of cellulosic substrates. However, this may not be necessary in many instances since the self-supported polystyrene latex of this invention can in itself be formulated to the proper viscosity for coating cellulosic substrates.

The coating compositions set forth herein can find extensive use in the coating of cellulosic paper substrates such as paper cups, paper plates, laminated paper sheets or containers. These products may be coated on either the interior or exterior or both surfaces thereof. Such containers find excellent use for holding both hot and cold drinking fluids, dairy products such as milk, butter, cheese, etc., meats, produce products, etc. In particular it has found excellent use in coating cellulosic paper drinking cups.

It will thus be seen that the objects set forth above among those made apparent from the description are efficiently attained and since changes may be made in carrying out the above process and in the compositions set forth without departing from the scope of this invention, it is intended that all matters contained in the above description shall be interpreted as illustrative and not in a limiting sense.

What is claimed is:
1. A coating composition consisting of a homogeneous blend of:
   A. 30–70 parts by weight, based on the polymer solids, of an emulsion polymerized styrene homopolymer latex containing as a sole emulsifier 10–40 weight percent thereof of a salt of a partial ester of a styrene maleic anhydride copolymer, said salt:
      (1) having been present during the preparation by emulsion polymerization of said homopolymer latex,
      (2) having a molecular weight of about 1000–20,000 and
      (3) having in its structure recurring groups of the formulae:

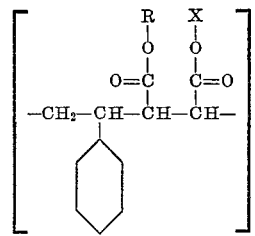

and

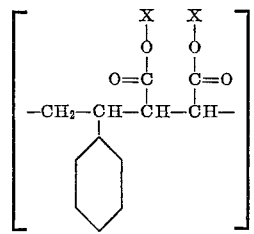

wherein
   (a) the groups of Formula I constitute 20–100% of the total of groups of Formulae I and II,
   (b) R is an organic radical of 1–20 carbon atoms selected from the group consisting of alkyl radicals, aryl radicals, aralkyl radicals, cycloalkyl radicals and ether radicals,
   (c) X is selected from the group consisting of ammonium, substituted ammonium and alkali metal ions;
and correspondingly,
   B. 70–30 parts by weight, based on the polymer solids, of an emulsion polymerized styrene interpolymer latex consisting of at least 50 weight percent of styrene with the balance thereof being a monomeric material which is interpolymerizable with the styrene and selected from the group consisting of mono-olefins, diolefins, ethylenically unsaturated nitriles, ethylenically unsaturated acids, esters of ethylenically unsaturated acids with alcohols containing 1–18 carbon atoms and vinylidene aromatic compounds other than styrene.

2. The composition of claim 1 wherein the number of the groups of Formula I constitutes 30–70% of the total of the groups of Formulae I and II.

3. The composition of claim 1 wherein R contains 4–8 carbon atoms.

4. The composition of claim 1 wherein the salt of the partial ester of the styrene maleic anhydride copolymer is the ammonium salt of a butyl Cellosolve partial ester of a styrene maleic anhydride copolymer.

5. The composition of claim 1 containing in the blend 0.2–3.0 parts by weight on the solids thereof of a non-reactive siloxane polymeric emulsion.

6. A cellulosic paper substrate having on at least one surface thereof a continuous coating consisting of a homogeneous blend of:

A. 30–70 parts by weight, based on the polymer solids, of an emulsion polymerized styrene homopolymer latex containing as a sole emulsifier 10–40 weight percent of a salt of a partial ester of a styrene maleic anhydride copolymer, said salt:
(1) having been present during the preparation by emulsion polymerization of said homopolymer latex,
(2) having a molecular weight of about 1000–20,000 and
(3) having in its structure recurring groups of the formulae:

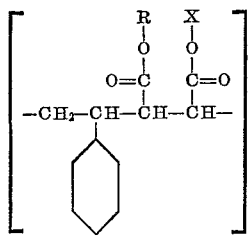

and

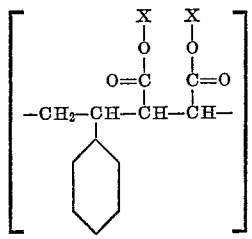

wherein
(a) the groups of Formula I constitute 20–100% of the total of groups of Formulae I and II,
(b) R is an organic radical of 1–20 carbon atoms selected from the group consisting of alkyl radicals, aryl radicals, aralkyl radicals, cycloalkyl radicals and ether radicals,
(c) X is selected from the group consisting of ammonium, substituted ammonium and alkali metal ions;

and correspondingly,

B. 70–30 parts by weight, based on the polymer solids, of an emulsion polymerized styrene interpolymer latex consisting of at least 50 weight percent of styrene with the balance thereof being a monomeric material which is interpolymerizable with the styrene and selected from the group consisting of monoolefins, diolefins, ethylenically unsaturated nitriles, ethylenically unsaturated acids, esters of ethylenically unsaturated acids with alcohols containing 1–18 carbon atoms and vinylidene aromatic compounds other than styrene.

7. The product of claim 6 wherein the paper substrate is a cup.

8. The product of claim 6 wherein the paper substrate is a cellulosic paper plate.

9. The product of claim 6 wherein the salt of the partial ester of a styrene maleic anhydride copolymer is the ammonium salt thereof.

10. The dried coating composition of claim 9 wherein the partial ester of a styrene maleic anhydride copolymer has in its structure recurring groups of the formulae:

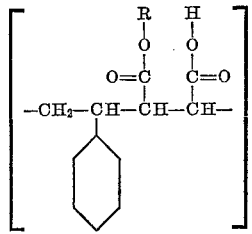

and

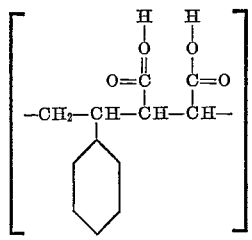

with the groups of Formula I constituting 20–100% of the total of the groups of Formulae I and II, and wherein R is an organic radical of 1–20 carbon atoms selected from the group consisting of alkyl radicals, aryl radicals, aralkyl radicals, cycloalkyl radicals and ether radicals.

11. The product of claim 6 wherein the cellulosic paper substrate is a laminated cellulosic paper substrate consisting of at least two laminated sheets thereof.

References Cited
UNITED STATES PATENTS

| | | |
|---|---|---|
| 2,760,884 | 7/1956 | Graf. |
| 2,963,452 | 12/1960 | Sinn et al. |
| 3,149,020 | 9/1964 | Fordyce et al. |

MURRAY TILLMAN, *Primary Examiner.*

W. J. BRIGGS, Sr., *Assistant Examiner.*